United States Patent
Böhme et al.

(10) Patent No.: US 7,122,708 B1
(45) Date of Patent: Oct. 17, 2006

(54) HIGH-FUNCTIONALITY POLYETHER POLYOLS AND PREPARATION THEREOF

(75) Inventors: Peter Böhme, Böhla (DE); Michael Pcolinski, Bloomfield, MI (US); Udo Rotermund, Ortrand (DE); Wolf-Dieter Habicher, Dresden (DE); Antje Ziemer, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/275,148

(22) PCT Filed: May 10, 2000

(86) PCT No.: PCT/EP01/05426

§ 371 (c)(1),
(2), (4) Date: Nov. 1, 2002

(87) PCT Pub. No.: WO01/85826

PCT Pub. Date: Nov. 15, 2001

(30) Foreign Application Priority Data

May 12, 2000 (DE) ............................. 100 23 250
May 12, 2000 (DE) ............................. 100 23 255

(51) Int. Cl.
C07C 43/164 (2006.01)
C07C 43/20 (2006.01)
C07C 43/275 (2006.01)

(52) U.S. Cl. .............. 568/631; 568/609; 568/630; 568/632; 568/633; 568/640; 568/644

(58) Field of Classification Search ............ 568/609, 568/631, 630, 632, 633, 640, 644
See application file for complete search history.

(56) References Cited

U.S. PATENT DOCUMENTS 5,780,403 A * 7/1998 Moreton ............... 508/580

OTHER PUBLICATIONS

Fujimoto et al, Solution to surface molecular delivery system using a macrocyclic sugar cluster, Journal of the American Chemical Society, 1997, vol. 119, pp. 6676-6677.*

Kurita et al, Macrocyclic amphiphiles, Journal of Materials Chemistry, 1998, vol. 8(2), pp. 397-403.*

Hyatt, Octopus molecules in the cyclotriveratrylene series, Journal of Organic Chemistry, 1978, vol. 43(9), pp. 1808-1811.*

Neda et al, A new synthesis of tetrakis (C-methyl) octakis (hydroxyethyl) calix[4]resorcinarene via an ethoxy-tethered trimethylsiloxy precursor, Zeitschrift fuer Naturforschung, 1998, vol. 53(8) pp. 841-848.*

Fujimoto et al, Oct(galactose) derivative of calix[4]resorcarene as a versatile host in water, Gazzetta Chimica Italiana, 1997, vol. 127(11), pp. 749-752.*

Shivanyuk et al, 3, 5, 10, 12, 17, 19, 24, 26-Octakis (beta-hydroxyethoxy)-1, 8, 15, 22-tetraaryl[14]metacyclophanes, Zhurnal Obshchei Khimii, 1994, vol. 64(5), pp. 837-839.*

* cited by examiner

Primary Examiner—Charles Boyer
(74) Attorney, Agent, or Firm—Fernando A. Borrego

(57) ABSTRACT

The invention relates to high-functionality polyether polyols of the general formula

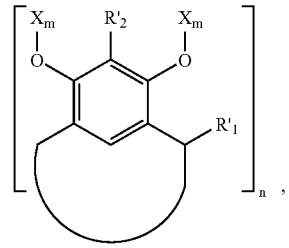

where each $R'_1$ is an unsubstituted or substituted aliphatic or aromatic radical and each $R'_2$ is an unsubstituted or substituted aliphatic or aromatic radical, H, OH, polyalkyl ether chain or halogen, each X is a polyalkyl ether chain or H, where at least one X is a polyalkyl ether chain, and m is an integer from 0 to 20, where $X_m$ is H when m is 0, and n is an integer from 4 to 12, to processes for preparing such high-functionality polyether polyols and also to the use thereof for preparing polyurethanes and nonionic surfactants.

8 Claims, No Drawings

HIGH-FUNCTIONALITY POLYETHER POLYOLS AND PREPARATION THEREOF

High-functionality polyether polyols and preparation thereof.

The invention relates to high-functionality polyether polyols based on resorcinol and also to processes for preparing such high-functionality polyether polyols by alkoxylating calix[n]resorcinarenes or by converting resorcinol and resorcinol derivatives in a complete synthesis.

Calix[n]arenes are cyclic compounds which may be prepared by condensing phenols with aldehydes. A specific subgroup of calix[n]arenes are the calix[n]resorcinarenes which are synthesized using resorcinol or resorcinol derivatives as the phenol components.

The synthesis of calix[n]resorcinarenes by acid-catalyzed condensation of an aldehyde with resorcinol is known. The condensation in the presence of hydrochloric acid is described, for example, by A. G. S. Högberg (J. Org. Chem. 1980, 45, 4498–4500) and in the presence of sulfuric acid by J. B. Niederl and H. J. Vogel (J. Am. Chem. Soc. 1940, 62, 2512). DD 290 412 shows the preparation of various calix[n]resorcinarenes by the hydrochloric acid or sulfuric acid catalyzed conversion of resorcinol and various derivatives thereof.

The conversion of the cyclic compounds to polyether polyols has hitherto only been described for calix[n]arenes:

Shi et al. react calix[8]arene with ethylene oxide using equivalent quantities of KO$^t$Bu (Y. Shi, Z. Zhang, J. Chem. Soc., Chem. Commun. 1994, 7, 375–376). The calix[8]arene is dissolved in toluene and admixed with equivalent quantities of KO$^t$Bu. The alkoxide is formed in 8 h under reflux. After removal of the solvent, the alkoxide is initially charged into an autoclave with ethylene oxide under a nitrogen atmosphere and heated to from 170 to 180° C. The workup is effected by means of ion exchangers. A very low base concentration is sought for the polyetherol formation, since limiting values of 10 and 100 ppm exist for alkali concentrations in polyetherols. The use of equivalent quantities of KO$^t$Bu is too high. To reduce the charging times, a short alkoxide formation time is sought. Reactions with alkylene oxides at low temperatures shall also be possible, in order to obtain very light-colored products.

Cornforth et al. use about 2% of K$^t$OBu or elemental potassium to catalyze the ethoxylation (J. W. Cornforth, E. D. Morgan, K. T. Potts, R. J. Rees, Tetrahedron Lett. 1973, 29, 1659–1667). The ethoxylation is effected in an autoclave at 150° C. in toluene. To neutralize the reaction mixture, acetic acid is added during the workup. A reduction in the base concentration and also low reaction temperatures are sought.

The alkoxylation of calix[n]arenes is also described in U.S. Pat. No. 4,259,464, U.S. Pat. No. 4,098,717 and U.S. Pat. No. 4,032,514. These show the alkoxylation of calix[n] arenes at from 120 to 140° C. using from 3 to 5% by mass of KOH. To form the alkoxide, the calix[n]arene is dissolved in xylene with addition of water and heated for more than one hour under reflux. Under azeotropic conditions, the water is removed again. The preparation of the alkoxide including water removal takes from 3 to 6 hours. After transfer to a pressure reactor or autoclave, the alkylene oxide is metered in at a reaction temperature of from 120 to 140° C. over from 2 to 12 h. The base concentration used is too high to be able to achieve the low limiting values after removing the potassium salt and requires a very complicated workup. The preparation of the alkoxide over a duration of from 3 to 6 h is uneconomic.

JP-A-2053749 demonstrates the preparation of polyether derivatives of calix[n]arenes by etherification using polyethylene glycol derivatives of the general formula $X(CH_2CH_2O)_mR$ with the addition of alkali metals (LiOH, NaOH, $Na_2CO_3$, $K_2CO_3$) and phase transfer catalysis in organic solvents at 40° C.

Neither the alkoxylation of calix[n]resorcinarenes nor the synthesis of calix[n]resorcinarenes and the subsequent alkoxylation thereof without intermediate workup in a complete synthesis are known. The use of such products as polyol components in foams and as nonionic surfactants is likewise not described.

The polycondensation products of resorcinol and resorcinol derivatives with aldehydes, the calix[n]resorcinarenes, are easy to access synthetically. Because of their high number of phenolic OH groups, they are of interest as starting compounds for high-functionality polyether polyols.

It is an object of the present invention to develop novel high-functionality polyether polyols based on resorcinol or resorcinol derivatives and also to provide synthetic routes for preparing such polyether polyols. These high-functionality polyether polyols shall be suitable, for example, for preparing rigid polyurethane (PU) foams.

We have found that this object is achieved by constructing polyether polyols which are preparable by alkoxylation of calix[n]resorcinarenes or by reaction of resorcinol and/or resorcinol derivatives with aldehydes and subsequent addition of alkylene oxides.

The invention accordingly provides high-functionality polyether polyols of the general formula

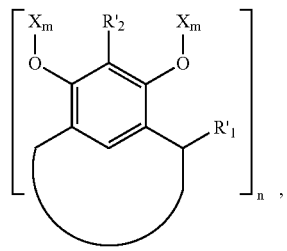

where each $R'_1$ is an unsubstituted or substituted aliphatic or aromatic radical and each $R'_2$ is an unsubstituted or substituted aliphatic or aromatic radical, H, OH, polyalkyl ether chain or halogen, each X is a polyalkyl ether chain or H, where at least one X is a polyalkyl ether chain, and m is an integer from 0 to 20, where $X_m$ is H when m is 0, and n is an integer from 4 to 12, and also the use thereof for preparing polyurethanes and nonionic surfactants.

The invention further provides processes for preparing high-functionality polyether polyols by reacting calix[n] resorcinarenes of the general formula

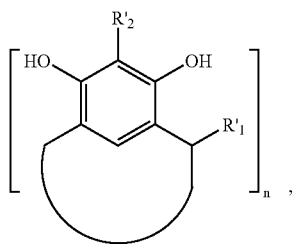

where each $R'_1$ is an unsubstituted or substituted aliphatic or aromatic radical and each $R'_2$ is an unsubstituted or substituted aliphatic or aromatic radical, H, OH, polyalkyl ether chain or halogen and n is an integer from 4 to 12, with alkylene oxides or by reacting resorcinol and/or resorcinol derivatives with aldehydes and subsequently adding alkylene oxides to solvents using catalysts.

The alkoxylated calix[n]resorcinarenes according to the invention are of interest as polyol components for PU, in particular PU foams, since positive effects of the insulation ability are expected from the high aromatic content. This novel class of compounds further provides a simple and cost-effective access route to high-functionality polyether polyols. Properties of the calix[n]resorcinarenes, for example the complexing behavior of ions or organic compounds, may be utilized in foams in this way. These novel polyether polyols also allow novel property variations to be realized in a wide range of PU products.

Such polyether polyols, in particular the ethoxylated calix[n]resorcinarenes, are also of interest as nonionic surfactants, since this facilitates precise adjustment of HLB (hydrophilic/lipophilic balance) values and solubilities and also a combination of complex formation and surfactant effect. As well as the provision of the property variations of the polyurethanes mentioned, this also enables their industrial processing behavior during production to be optimized.

The high-functionality polyether polyols according to the invention have the general formula

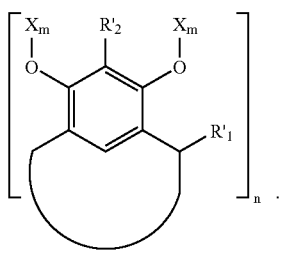

The number n is an integer from 4 to 12, preferably from 4 to 8. Advantageously, mainly the tetramer (n=4) is chosen for the desired areas of application.

The $R'_1$ substituent is a saturated or unsaturated, unsubstituted or substituted aliphatic radical or an aromatic radical. Preference is given to the $R'_1$ substituent being an alkyl chain of from 1 to 20 carbon atoms, linear or branched, or a substituted aromatic compound. Particular preference is given to alkyl chains, branched or linear, having from 1 to 10 carbon atoms and phenol derivatives.

The $R'_2$ substituent is a saturated or unsaturated, unsubstituted or substituted aliphatic radical or an aromatic radical, H, OH, polyalkyl ether chain or halogen. Preference is given to the $R'_2$ substituent being an alkyl chain having from 1 to 20 carbon atoms, linear or branched, or a substituted aromatic. Particular preference is given to alkyl chains, branched or linear, having from 1 to 10 carbon atoms and phenol derivatives. Examples of useful $R'_2$ substituents include $—CH_2$-halogen, $—CH_2—SO_3H$, $—CH_2—N(alkyl)_2$ and polyalkyl ether chains having from 1 to 20, but preferably from 1 to 7, alkylene oxide units.

Each X is a polyalkyl ether chain or H, where at least one X is a polyalkyl ether chain. Advantageously, the polyalkyl ether chains consist of ethylene oxide or propylene oxide or ethylene oxide and propylene oxide in random or block arrangement. However, the polyalkyl ether chains may also consist of other alkylene oxides, for example, butylene oxide, glycidol or

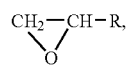

where R is preferably -phenyl, $—CH_2$-phenyl or $—C_6H_{13}$, or any desired mixtures of alkylene oxides mentioned or further alkylene oxides.

The type of alkylene oxides used and the degree of alkoxylation enables the properties of the polyether polyols according to the invention to be varied within a wide range. Each number m is an integer in the range from 0 to 20. The alkyl ether chains preferably have a length m from 0 to 7. When m is 0, Xm is H. For the use of polyetherols in rigid PU foams, a degree of alkoxylation of from m=0 to 10 has proven useful. The OH numbers of the polyether polyols according to the invention are in the range from 50 to 1000 mg KOH/g, preferably from 50 to 500 mg KOH/g.

These partially or completely alkylene oxide-containing polyether-calix[n]resorcinarenes are suitable, for example, for preparing PU, in particular rigid PU foams. The polyether-calix[n]resorcinarenes containing alkylene oxide chains, preferably ethylene oxide chains, are usable in particular as substantially nonionic surfactants.

The high-functionality polyether polyols according to the invention are preparable, for example, by reacting calix[n]resorcinarenes of the general formula

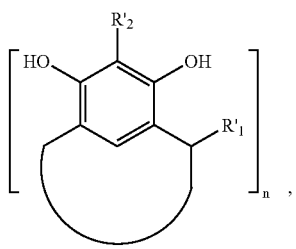

with alkylene oxides using catalysts.

The $R'_1$ and $R'_2$ substituents and also the number n are as already defined above.

The calix[n]resorcinarenes are preparable, for example, by a process of J. B. Niederl and H. J. Vogel (J. Am. Chem. Soc. 1940, 62, 2512). This involves heating resorcinol and an appropriate aldehyde in ethanol at 70° C. The reaction is effected by adding a catalyst, in particular sulfuric acid.

Equation of the calix[n]resorcinarene synthesis:

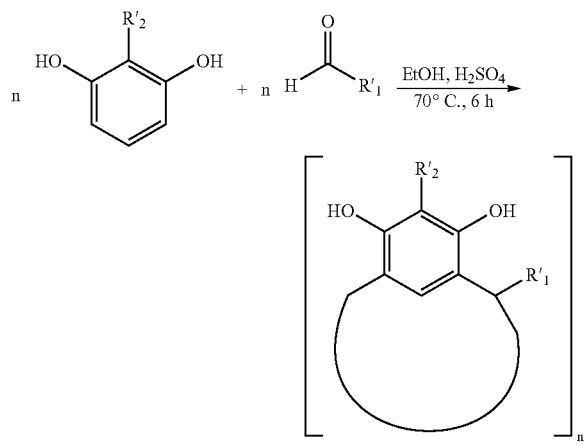

Preference is given to reacting the calix[n]resorcinarenes with the alkylene oxides described in detail above by addition of propylene oxide or of propylene oxide and ethylene oxide, either randomly or in blocks. The reaction of the solid calix[n]resorcinarenes which have a high melting point with alkylene oxides liquefies them and additionally substantially improves their solubility properties.

The alkoxylation is carried out without or in the presence of solvents. If solvents are used, useful solvents include in particular inert, aprotic solvents or reactive polyether polyols, alone or in mixtures.

For example, useful solvents include diethylene glycol dimethyl ether, dibutyl ether and toluene. However, other familiar inert solvents can also be used.

The use of polyetherols as solvent is very particularly advantageous. Useful polyetherols for this purpose include all customary polyetherols, as are described in the patent and other scientific literature. Advantageously, commercial polyetherols, for example those based on sorbitol, glycerol, ammonia, primary or secondary amines or water, are used.

The advantage in using polyetherols as solvent is that during the workup of the product mixture, no solvent has to be distilled off in addition to the normal workup steps, which leads to simplification of the technology and to cost savings.

If polyether polyols are used as solvent, the fraction of calix[n]resorcinarenes in the polyether polyol are limited solely by the limited solubility thereof in the polyether polyol.

In an alkoxylation without the use of inert solvents, the calix[n]resorcinarene is reacted directly with the alkylene oxide.

Useful catalysts for the alkoxylation include in particular all customary basic or acidic catalysts, for example, potassium hydroxide, potassium tert-butoxide, cesium hydroxide, sodium, triethylamine, tributylamine and boron trifluoride etherate.

Preference is given to using the catalysts in a quantity of from 0.1 to 5% by mass, in particular from 0.3 to 1% by mass, based in each case on the entire batch.

A further advantageous possibility for preparing high-functionality polyether polyols according to the invention is the reaction of resorcinol and/or resorcinol derivatives with aldehydes and subsequent addition of alkylene oxides using catalysts.

This process is advantageously carried out in a one-stage process without intermediate separation of the calix[n]resorcinarenes formed as intermediates, also referred to in the following as a one-pot process.

Useful resorcinol derivatives include in particular products of the following general formula:

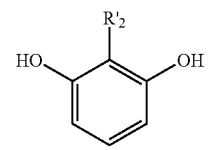

$R'_2$ is a saturated or unsaturated, unsubstituted or substituted aliphatic radical or an aromatic radical, H (resorcinol), OH (pyrogallol) or halogen. These are preferably alkyl chains, linear or branched, saturated or unsaturated, having from 1 to 20 carbon atoms, more preferably carbon chains of length from 1 to 10, in particular from 1 to 5. Examples of useful $R'_2$ radicals also include substituted aromatics, —$CH_2$-halogen, —$CH_2$—$SO_3H$, —$CH_2$—$N(alkyl)_2$ or polyalkyl ether chains. $R'_2$ is particularly preferably H.

Useful aldehydes are in particular products of the following general formula:

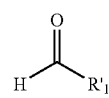

$R'_1$ is an unsubstituted or substituted aliphatic or aromatic radical. This is preferably a carbon chain, saturated or unsaturated, branched or linear, having from 1 to 20 carbon atoms, more preferably linear or branched, saturated carbon chains having from 1 to 10 carbon atoms and phenol derivatives.

The calix[n]resorcinarenes occurring as intermediates are converted to polyether polyols using alkylene oxides, as described above.

In this process also, the type of alkylene oxides used and the degree of alkoxylation can be used to vary the properties of the polyether polyols according to the invention within a wide range.

The one-pot process is likewise carried out without or preferably in the presence of solvents. If solvents are used, useful solvents include the solvents or polyether polyols described above, either alone or in mixtures.

The overall synthesis may be effected using different catalysts for the formation reaction of the calix[n]resorcinarenes and for the alkoxylation. However, it is particularly advantageous to use a catalyst which catalyzes both reactions.

Useful catalysts include all customary basic or acidic catalysts, as have been cited above by way of example.

Specifically, the ring closure reaction to give the calix[n]resorcinarene requires acid or Lewis acid, while the subsequent alkoxylation may be acid- or base-catalyzed. If acid or Lewis acid is chosen as catalyst, for example the preferably used borontrifluoride, the process can be carried out without changing the catalyst before the alkoxylation. According to the invention, both combinations without intermediate separation of the calix[n]resorcinarene intermediates are possible.

Preference is given to using the catalysts in a total quantity of from 0.05 to 5 percent by mass, in particular of from 0.2 to 1% by mass, drawn in each case on the entire batch. If different catalysts are used in the overall synthesis for the formation reaction of the calix[n]resorcinarenes and for the alkoxylation, preference is given to using the catalysts for the formation reaction of the calix[n]resorcinarenes (using, for example, a mineral acid as catalyst) in a quantity of from 0.005 g/mmol of resorcinol used to 0.9 g/mmol of resorcinol used, in particular of from 0.1 g/mmol of resorcinol used to 0.07 g/mmol of resorcinol used, and preference is given to using the catalyst for the alkoxylation in a quantity of from 0.05 to 5% by mass, in particular from 0.2 to 1% by mass.

In both process variants, the reaction is advantageously effected in an inert gas atmosphere at a temperature of from 50 to 150° C. and a maximum pressure of 100 bar, preferably maximum 40 bar, more preferably maximum 10 bar.

The polyether polyols prepared in this way may be worked up in a customary manner. Preference is given to effecting the workup by neutralization with acids, in particular phosphoric acid, or using ion exchanger materials, for example Ambosol, filtration and reduced pressure distillation to remove low-boiling by-products and the solvent.

The product obtained is a clear to dark brown liquid, possibly having a high viscosity. Depending on the degree of alkoxylation and by-product content, the alkylene glycols, in the product mixture or the viscosity of the polyether polyol used, this is in the range from 100 (25° C.) to 30 000 (75° C.) mPa·s.

The invention is illustrated by the following examples:

EXAMPLE 1

Preparation of Calix[n]Resorcinarenes 0.5 mol of resorcinol in 0.5 mol of pelargonaldehyde were dissolved in 400 ml of ethanol. After attainment of the reaction temperature of 70° C., concentrated sulfuric acid (0.04 ml/1 mmol) was added over a period of half an hour and stirred for a further 6 h at this temperature.

The calix[n]resorcinarenes prepared from aliphatic aldehydes in this manner were precipitated by adding 400 ml of water and washed to neutrality.

EXAMPLE 2

Preparation of Calix[n]Resorcinarenes 0.5 mol of resorcinol in 0.5 mol of 4-hydroxybenzaldehyde were dissolved in 400 ml of ethanol. After attainment of the reaction temperature of 70° C., concentrated sulfuric acid (0.04 ml/1 mmol) was added over a period of half an hour and stirred for a further 6 h at this temperature.

The calix[n]resorcinarenes prepared from aromatic aldehydes in this manner were filtered off after cooling the reaction mixture to room temperature and washed to neutrality.

EXAMPLE 3

Reaction with Propylene Oxide 3.1 60 g (64.0 mmol) of the calix[n]resorcinarene where $R'_1=C_8H_{17}$ and $R'_2=H$ were dissolved in 400 ml of diethylene glycol dimethyl ether in an autoclave and admixed with 1 mol % of $BF_3$-etherate. After attainment of the alkoxylation temperature of 70° C., 150 g (2.26 mol) of propylene oxide were metered in in stages over 4 h. Stirring was continued at 70° C. for a further 9 h and a nitrogen pressure of max. 5 bar. Workup was effected by adding 5% by weight of water for an hour at 90° C. and subsequent distillation under reduced pressure to remove the solvent.

This resulted in a polyether polyol having the following data: OH number 167 mg KOH/g, viscosity (25° C.) 756 mPa·s, Na content 16.5 ppm and K content 35.3 ppm, water content<0.05% by weight, alkoxylated calix[n]resorcinarene content 73% by weight (GPC), from 0.1 to 0.9 PO molecules could be added per functionality (MALDI-TOF).

3.2 60 g (64.0 mmol) of the calix[n]resorcinarene where $R'_1=C_8H_{17}$ and $R'_2=H$ were dissolved in 400 ml of diethylene glycol dimethyl ether in an autoclave and admixed with 0.5% by mass of CsOH (solid). After inertization using nitrogen, the mixture was stirred at 70° C. for half an hour. After distillation under reduced pressure to remove water, the mixture was heated to the alkoxylation temperature of 135° C. Over 4 hours, 150 g (2.56 mol) of propylene oxide were metered in in stages. Stirring was continued for a further 9 h under nitrogen pressure and an overall pressure of max. 10 bar at 135° C. Workup was effected by adding 5% by weight of an ion exchanger. Low-boiling components including the solvent were removed by means of distillation under reduced pressure.

This resulted in a polyether polyol having the following data: OH number 227 mg KOH/g, viscosity (75° C.) 16 449 mPa·s, Na content 116 ppm, K content 8.9 ppm, Cs content 21.5 ppm, water could not be determined, acid number below detection limit, alkoxylated calix[n]resorcinarene content 97% by weight (GPC), 0.4–1.4 PO molecules could be added per functionality (MALDI-TOF).

3.3 60 g (64.0 mmol) of the calix[n]resorcinarene where $R'_1=C_8H_{17}$ and $R'_2=H$ were dissolved in 400 ml of diethylene glycol dimethyl ether in an autoclave and admixed with 0.5% by mass of KOH. To form the alkoxide, stirring was effected at 70° C. for ½ h. After a distillation under reduced pressure to remove water, the mixture was heated to 135° C. 150 g (2.56 mol) of propylene oxide were then metered in in stages over 4 h. Stirring was continued at 135° C. for a further 9 h and a nitrogen pressure of max. 5 bar. Workup was effected by adding 3% by weight of water for an hour at 90° C. and subsequent distillation under reduced pressure to remove the solvent.

This resulted in a polyether polyol having the following data: OH number 145 mg KOH/g, viscosity (25° C.) 1694 mPa·s, Na content 114 ppm, K content 476 ppm, water content 0.073% by weight, alkoxylated calix[n]resorcinarene content 80% by weight (GPC), 4–5.8 PO molecules could be added per functionality (MALDI-TOF).

EXAMPLE 4

Reaction with Ethylene Oxide 90 g (96.0 mmol) of the calix[4]resorcinarene ($R=C_8H_{17}$) were dissolved in 400 ml of diethylene glycol dimethyl ether in an autoclave and admixed with 0.35% by mass of Na. To form the alkoxide, stirring was effected at 70° C. for ½ h. After distillation under reduced pressure to remove water, the mixture was heated to 135° C. 170 g (3.84 mol) of ethylene oxide were then metered in in stages over 4 h. Stirring was continued at 135° C. for a further 9 h and a nitrogen pressure of max. 5 bar. Workup was effected by adding 5% by weight of Ambasol/water for one hour at 90° C. and subsequent distillation under reduced pressure to remove the solvent.

This resulted in a polyether polyol having the following data: OH number 305 mg KOH/g, viscosity (25° C.) 667 mPa·s, Na content 429 ppm, K content 6.5 ppm, water content 0.016% by weight, acid number 0.317 mg KOH/g, alkoxylated calix[4]resorcinarene content 70% by weight (GPC), ethylene glycols 30% by weight.

EXAMPLE 5

Reaction with Glycidol 10 g (0.01 mol) of calix[4]resorcinarene (R=$C_8H_{17}$) were dissolved in 200 ml of diethylene glycol dimethyl ethyl ether. After adding 1% by mass of KOH, inertization was effected. After heating the reaction mixture to 70° C., it was stirred for half an hour at this temperature. After attainment of a temperature of 120° C., 6.32 g (0.08 mol) of glycidol in 10 ml of diethylene glycol dimethyl ether were added dropwise and the mixture stirred at this temperature for a further 6 h.

Workup was effected by means of 5% of Ambasol/water.

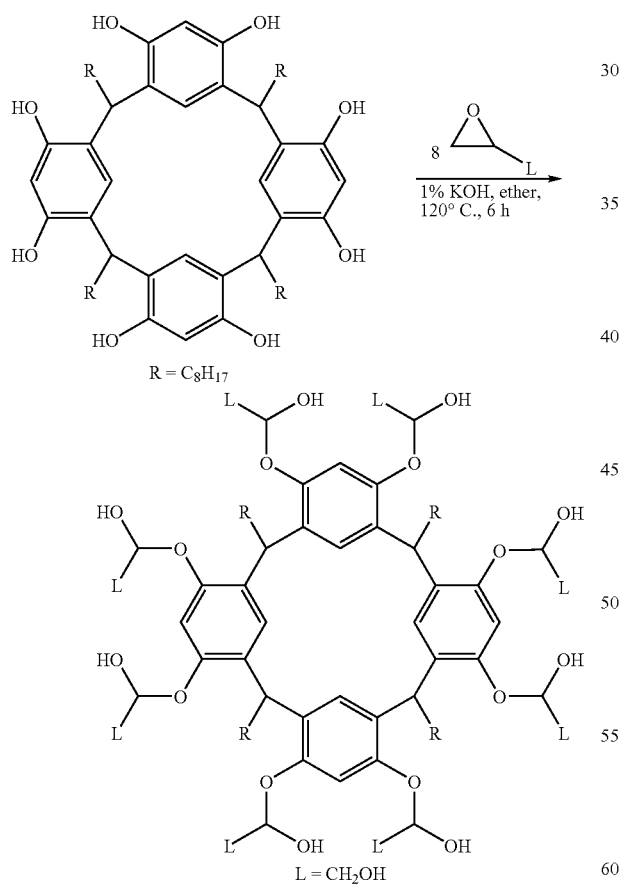

EXAMPLE 6

1 mol % of boron trifluoride was used to catalyze the synthesis of the calix[n]resorcinarenes from 500 mmol of resorcinol with 500 mmol of pelargonaldehyde in 800 ml of a polyether polyol (Lupranol® 3300). The reaction was effected in an inert gas atmosphere at a temperature of 70° C. After a reaction time of several hours, 1 mol % of catalyst was again added and 4.96 mol of propylene oxide were metered in at a temperature of 70° C. after proceeding repeated inertization. (Stirring speed 125 1 min, max. pressure 5 bar).

Workup was effected by adding 5% by weight of water and heating to 90° C. for one hour. Low-boiling components were removed by distillation under reduced pressure. The product obtained was a brown liquid of average viscosity.

This resulted in a polyether polyol having the following data: alkoxylated calixresorc[4]arene content 49% by weight, polyether polyol 49% by weight, 2% by weight of propylene glycols, OH number: 272 mg KOH/g, viscosity (25° C.) 226 mPa·s, Na content 3.2 ppm, K content 20.0 ppm, acid number 2.04 mg KOH/g.

EXAMPLE 7

Concentrated sulfuric acid (0.04 ml/1 mmol) was used to catalyze the synthesis of the calix[n]resorcinarenes from 464 mmol of resorcinol and 464 mmol of pelargonaldehyde in a polyether polyol (Lupranol® 3300). The reaction was effected in an inert gas atmosphere at a temperature of 70° C. After a reaction time of several hours, the mixture was neutralized by adding KOH and 0.5% by mass of KOH catalyst were initially charged. 4.64 mol of propylene oxide were metered in at a temperature of 135° C. after proceeding inertization (stirring speed 125 1/min, max. pressure 5 bar).

The workup was effected by neutralization with ion exchanger materials (Ambosol), filtration and distillation under reduced pressure to remove low-boiling by-products. The product obtained was a clear to dark brown liquid.

This resulted in a polyether polyol having the following data: alkoxylated calix[4]resorcinarene content 26% by weight, polyether polyol 63% by weight, propylene glycols 11% by weight, OH number 373 mg KOH/g, viscosity (25° C.) 568 mPa·s, K content 126 ppm, Na content 133 ppm, water content<0.034%, acid number below detection limit.

We claim:
1. A high-functionality polyether polyol of the general formula

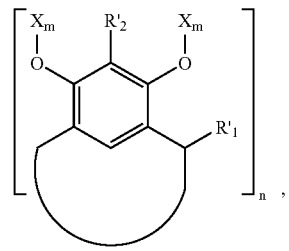

where each $R'_1$ is an unsubstituted or substituted aliphatic or aromatic radical and each $R'_2$ is an unsubstituted or substituted aliphatic or aromatic radical, H, OH, polyalkyl ether chain or halogen, each X is H or a polyalkyl ether chain made from propylene oxide, where at least one X is a polyalkyl ether chain made from propylene oxide, and m is an integer from 0 to 20 representing the number of repeating polyalkyl ether chains, where X is H when m is 0, and n is an integer from 4 to 12.

2. A high-functionality polyether polyol as claimed in claim 1, wherein m is from 1 to 7.

3. A high-functionality polyether polyol as claimed in claim 1, wherein its OH number is in the range from 50 to 1000.

4. A high-functionality polyether polyol as claimed in claim 2, wherein its OH number is in the range from 50 to 1000.

5. A high-functionality polyether polyol of the general formula

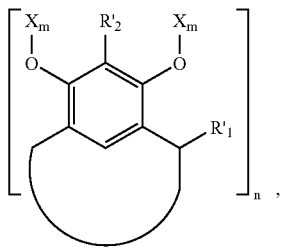

where each $R'_1$ is an unsubstituted or substituted aliphatic or aromatic radical and each $R'_2$ is an unsubstituted or substituted aliphatic or aromatic radical, H, OH, polyalkyl ether chain or halogen, each X is H or a polyalkyl ether chain made from ethylene oxide and propylene oxide, where at least one X is a polyalkyl ether chain made from ethylene oxide and propylene oxide, and m is an integer from 0 to 20 representing the number of repeating polyalkyl ether chains, where X is H when m is 0, and n is an integer from 4 to 12.

6. A high-functionality polyether polyol as claimed in claim 5, wherein m is from 1 to 7.

7. A high-functionality polyether polyol as claimed in claim 5, wherein its OH number is in the range from 50 to 1000.

8. A high-functionality polyether polyol as claimed in claim 6, wherein its OH number is in the range from 50 to 1000.

* * * * *